No. 616,169. Patented Dec. 20, 1898.
A. WEILHEIMER.
SPOKE SOCKET.
(Application filed Jan. 8, 1898.)
(No Model.)
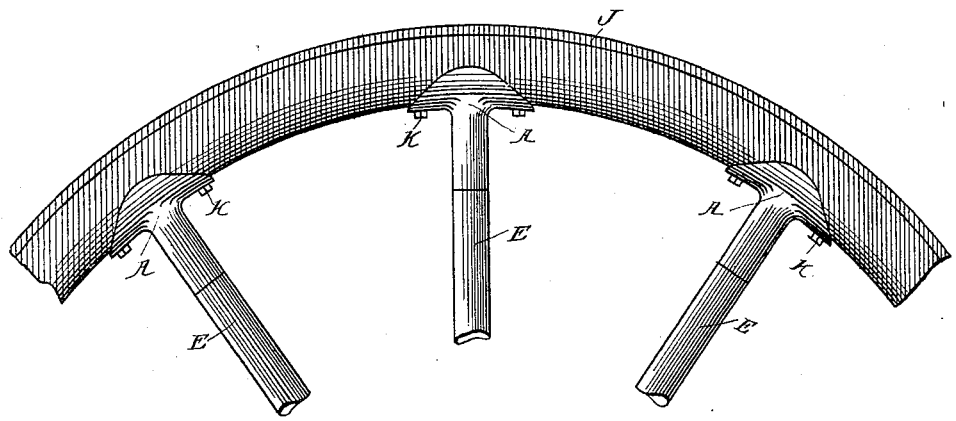
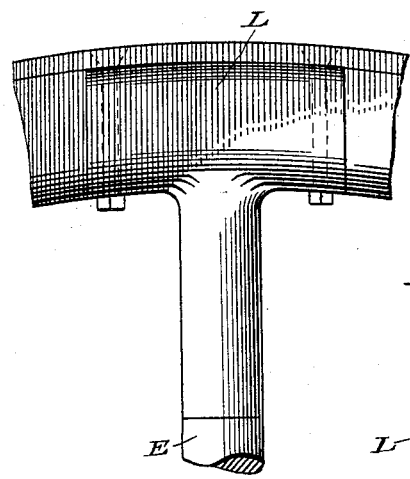
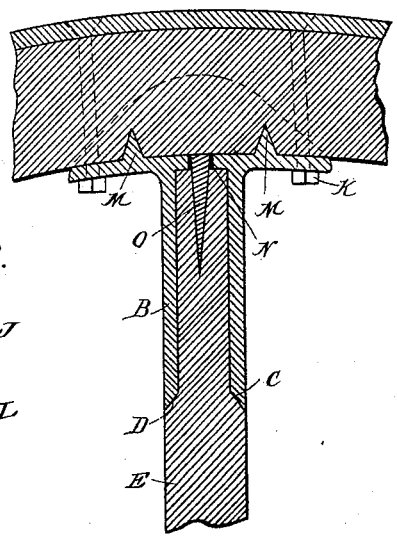
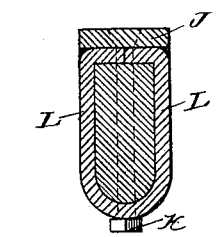
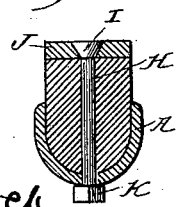
Witnesses
J. P. Britt
Chas. B. Brock
Inventor
A. Weilheimer
by O'Meara
Attorneys

UNITED STATES PATENT OFFICE.

AARON WEILHEIMER, OF FRESNO, CALIFORNIA.

SPOKE-SOCKET.

SPECIFICATION forming part of Letters Patent No. 616,169, dated December 20, 1898.

Application filed January 8, 1898. Serial No. 666,058. (No model.)

*To all whom it may concern:*

Be it known that I, AARON WEILHEIMER, residing at Fresno, in the county of Fresno and State of California, have invented a new and useful Spoke-Socket, of which the following is a specification.

This invention relates to improvements in spoke-sockets; and the object thereof is to provide a simple construction of socket whereby the spoke may be attached to the felly without weakening the latter by boring the same to receive the spoke, as in the usual construction.

With the above object in view the invention consists in the improved construction, arrangement, and combination of parts hereinafter fully described and afterward specifically pointed out in the claim.

In order to enable others skilled in the art to which my invention most nearly appertains to make and use the same, I will now proceed to describe its construction and operation, having reference to the accompanying drawings, forming part of this specification, in which—

Figure 1 is an elevation of a portion of a felly, showing my improved socket thereon. Fig. 2 is a side elevation of a modified form of socket. Fig. 3 is a transverse sectional view of the same. Fig. 4 is a longitudinal sectional view showing another modified construction. Fig. 5 is a transverse sectional view showing the securing-bolts passing through the tire as well as the felly and socket-plate. Fig. 6 is a transverse sectional view of the socket, showing the bolts as applied under the tire.

Like letters of reference mark the same parts wherever they occur in the various figures of the drawings.

Referring to the accompanying drawings, A indicates the plate of the socket, which is curved to suit the cross-sectional contour of the felly and is adapted to embrace opposite sides of the same, said plate having formed integrally therewith the inwardly-extending socket B, having its inner walls inclined adjacent the outer end thereof, as illustrated at C, to engage the inclined shoulder D, formed on the spoke E, the reduced portion F of said spoke entering the socket. The socket is secured to the felly by bolts H, having their heads I countersunk into the felly beneath the tire J and their screw-threaded ends passing through the plate of the socket and receiving the nuts K, as illustrated in Fig. 6. In light vehicles said bolts may pass through the tire and have their heads countersunk in said tire, as illustrated in Fig. 5; but for heavy vehicles I prefer the construction first set forth.

In the modification illustrated in Figs. 2 and 3 I extend the sides L of the plate upwardly and bend the ends thereof inwardly at right angles thereto to form what may be termed an "open-ended" casing, the felly being cut out to receive the same, so that the walls thereof are flush with the sides and periphery of the felly. The casing is secured in this instance by securing-bolts, as in the former construction, and a most strong and durable socket is provided.

In the modification illustrated in Fig. 6 I provide the plate with the tangs M, which engage the felly and serve to secure the plate in position in addition to the securing-bolts. It will also be noticed that in this construction the spoke does not extend through the socket and engage the felly, but that the inner end of the socket is closed and provided with a slot N, through which the wedge O extends, said wedge engaging the spoke and expanding the same and causing it to tightly engage the socket.

From the above description it will be seen that I have provided a very simple construction of spoke-socket, whereby the spoke is attached to the felly without weakening the latter by boring, and also that broken spokes may be readily removed and new ones inserted when necessary.

While I have illustrated and described the best means now known to me for carrying out my invention, I do not wish to be understood as restricting myself to the exact details of construction shown and described, but hold that any slight changes or variations such as might suggest themselves to the ordinary mechanic will properly fall within the limit and scope of my invention.

Having thus fully described my invention, what I claim as new, and desire to secure by Letters Patent of the United States, is—

In a spoke-socket the combination of a plate adapted to embrace the felly and having tangs adapted to engage the latter, a socket carried by the plate and having a closed inner end which is slotted, a wedge passing through said slot and engaging the end of the spoke, and bolts passing through the felly and plate and receiving nuts upon their ends, substantially as described.

AARON WEILHEIMER.

Witnesses:
E. L. HAMILTON,
GEO. E. CHURCH.